United States Patent
Leyonhjelm et al.

(10) Patent No.: US 6,393,451 B2
(45) Date of Patent: May 21, 2002

(54) FLEXIBILITY ENHANCEMENT TO THE MODIFIED FAST CONVOLUTION ALGORITHM

(75) Inventors: Scott Leyonhjelm, Sundbyberg; Richard Hellberg, Huddinge, both of (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/818,901

(22) Filed: Mar. 28, 2001

Related U.S. Application Data

(62) Division of application No. 09/156,630, filed on Sep. 18, 1998, now Pat. No. 6,266,687.

(51) Int. Cl.$^7$ .............................................. G06F 17/14
(52) U.S. Cl. ...................................... 708/420; 708/405
(58) Field of Search ............................... 708/300, 321, 708/403–405, 420; 702/77; 709/224; 370/210; 324/76.19; 375/219

(56) References Cited

U.S. PATENT DOCUMENTS

| | | | |
|---|---|---|---|
| 5,535,240 A | * 7/1996 | Carney et al. | ............... 375/219 |
| 5,999,573 A | * 12/1999 | Zangi | ......................... 370/210 |
| 6,134,299 A | * 10/2000 | Schwaller et al. | ........... 370/336 |

FOREIGN PATENT DOCUMENTS

| | | |
|---|---|---|
| WO | WO 95/28045 | 10/1995 |

OTHER PUBLICATIONS

"A Flexible On–Board Demultiplexer/Demodulator", S. Joseph Campanella et al., Proceedings of the 12$^{th}$ AIAA International Communications Satellite Systems Conference, 1988, pp. 299–303.

Swedish Patent Application No. 9802059–7, filed Jun. 10, 1998, "Digital Channeliser and De–Channeliser", R. Hellberg, pp. 1–29, Figures 1–10.

* cited by examiner

*Primary Examiner*—Tan V. Mai
(74) *Attorney, Agent, or Firm*—Burns, Doane, Swecker & Mathis, L.L.P.

(57) ABSTRACT

The present invention increases the flexibility of the modified fast convolution algorithm. In a first exemplary embodiment of the present invention, a block compensator is inserted into the channelizer/de-channelizer processing chain for multiplying data in the processing chain with compensation constants. The block compensator corrects the phase continuity problem associated with the modified fast convolution algorithm to thereby allow unrestricted filter placement. In a second exemplary embodiment, the phase continuity problem is corrected by combining a frequency translation in the frequency domain with a compensatory frequency translation in the time domain. Both techniques increase the flexibility of the modified fast convolution algorithm whilst only marginally increasing computational requirements.

24 Claims, 13 Drawing Sheets

Receiver Channeliser Implemented Via A Decimated Filter Bank

FLEXIBILITY ENHANCEMENT TO THE MODIFIED FAST CONVOLUTION ALGORITHM

This application is a divisional of aplication Ser. No. 09/156,630, filed Sep. 18, 1998 now U.S. Pat. No. 6,266,687.

BACKGROUND

The present invention relates generally to radio communication systems, or more particularly, to the use of a modified fast convolution algorithm in channelizers and de-channelizers of a radio communication system.

In radio base station applications for cellular, Land Mobile Radio (LMR), satellite, wireless local area networks (WLANs) and other communication systems, many receiving and transmitting channels are handled simultaneously. In the future, mobile terminals, i.e. mobile telephones, will also include this capability. Such systems include digital channelization and de-channelization structures in their receivers and transmitters, respectively. Channelization and de-channelization can be defined as the filtering, decimation/interpolation and the frequency conversion of the signals transmitted and received.

The traditional receiver architecture is illustrated in FIG. 1. In FIG. 1, a Radio Frequency (RF) signal is received by the antenna 105 and then downconverted to an intermediate frequency (IF) by a RF front end 110. The RF front end 110 consists of components such as Low Noise Amplifiers (LNAs), filters and mixers. The desired channel is then extracted by the receiver channelizer 120. The analog channelizer 120 also consists of LNAs, mixers and filters.

The desired channel is then processed at baseband by the RX baseband processing unit 130 to produce the received digital data stream. Today, baseband processing generally consists of analog-to-digital conversion, digital filtering, decimation, equalization, demodulation, channel decoding, de-interleaving, data decoding, timing extraction, etc.

The traditional transmitter architecture in FIG. 1 is the dual of the receiver architecture. The transmitted data is first processed by the TX baseband processing unit 140 which consists of data coding, interleaving, channel coding, modulation, interpolation filtering, digital-to-analog conversion, etc. The baseband channel is then converted to an IF frequency via the transmit de-channelizer 150. The transmit analog de-channelizer 150 consists of filters, mixers and low power amplifiers. The IF signal is then converted to RF and amplified by the RF front end 160 which consists of mixers, filters, and a high power amplifier. Finally, the signal is transmitted by the antenna 165.

FIG. 1 illustrates the traditional architecture for a single channel receiver and transmitter of a mobile terminal (i.e., mobile phone). In the case of a base station, multiple channels are processed in a similar way. On the receiver side, the path will split at some point to form multiple paths for each channel being processed. On the transmitter side, the channels will be processed individually and then combined at some point to form a multichannel signal. The point of the split and combination varies, and therefore, a variety of base station receiver and transmitter architectures can be created. More importantly, though, the traditional analog and digital interface is currently somewhere between the channelizer and baseband processing blocks.

The analog channelizer/dechannelizer is complex to design and manufacture, and therefore costly. In order to provide a cheaper and more easily produced channelizer/dechannelizer, the future analog and digital interface will lie, instead, somewhere between the RF front end and channelizer blocks. Future radio receiver and transmitter structures of this type are called a variety of names, including multi-standard radio, wideband digital tuners, wideband radio or software radio, and they all require a digital channelizer/dechannelizer.

Efficient digital channelizer/de-channelizer structures, which perform filtering, decimation/interpolation and frequency conversion, are very important in terms of power consumption and die area on a per channel basis. One of the main goals of these structures is to integrate as many channels into a single Integrated Circuit (IC) as possible.

There are several known ways to achieve digital channelization/de-channelization. The following examples will assume that a wideband signal is sampled by an ADC. The wideband signal is centered at an Intermediate Frequency (IF) and typically consists of many Frequency Division Multiplexed (FDM) channels. The most obvious way is illustrated in FIG. 2. This receiver architecture mimics the functions of a traditional analog channelizer with In-phase and Quadrature (IQ) frequency conversion using e.g. sin/cos generators, decimating and filtering on a per-channel basis. The bulk of the decimation filtering can be done with computationally cheap CIC filters. Integrated circuits containing this architecture are readily available from several manufacturers. One skilled in the art will appreciate that the dual of this architecture is also possible for the transmitter.

The IQ channelizer is flexible in that it can handle many standards simultaneously and the channels can be arbitrarily placed. Its main drawback is the need for IQ frequency conversion at a high input sampling frequency and subsequent decimation filters for each channel. This means that the die area and power consumption is relatively high per channel.

Another channelizer possibility is to build a decimated filter bank in the receiver, as shown in FIG. 3. This method shares a common polyphase filter between many, or all, channels. The hardware cost for this structure is small since it is split between many channels, and good filtering can be achieved. Filter banks are also good for use in transmitter de-channelizers since they both interpolate and add the channels together. An example of this is illustrated in WO 9528045 "Wideband FFT Channelizer".

Although these filter banks can be reconfigured to fit different standards, it is still difficult to accommodate multiple channel spacings at the same time. The decimated filter bank has a very low cost per channel, but only if all or the majority of channels are used. This architecture is also very inflexible since the channels have to lie on a fixed frequency grid with only one channel spacing being possible. Multiple standards make the filter bank concept require multiple sampling rates. This means that multiple architectures, including an analog-to-digital converter (ADC) and channelizer, are required for the simultaneous multiple standards.

A variation on the structure of the decimated filter bank, called a subsampled filter bank, can lower the computational cost at the expense of flexibility. For example, requirements for adaptive channel allocation, irregular channel arrangements and frequency hopping precludes using subsampled filter banks, since all channels must be available at the same time.

The third main channelization technique is based on the fast convolution scheme of the overlap-add (OLA) or overlap-save (OLS). Fast convolution is a means of using cyclic convolution to exactly perform linear convolution, i.e., Finite Impulse Response (FIR) filtering. The advantage of this technique is a lower computational requirement as compared to implementing the traditional form of linear convolution. Furthermore, it is possible to modify the basic fast convolution algorithm such that it is possible to simultaneously decimate/interpolate and frequency convert; however, as a result, the linear convolution is then only approximately performed. The modifications also reduce the computational complexity. The stand-alone modified fast convolution algorithm, as illustrated in "A Flexible On-board Demultiplexer/Demodulator", Proceedings of the 12th AIAA International Communication Satellite Systems Conference, 1988, pp. 299–303, is claimed to be a very computationally efficient technique for systems containing a mixture of carrier bandwidths, and has been discussed for use in satellite systems.

The stand-alone modified fast convolution algorithm in the prior art performs all the filtering alone, without any additional signal processing. This method leads to various delays. However, delays are an inherent part of satellite systems, due to the transmission times to and from the satellite. Thus, delays due to the filtering method affects the system proportionately less than if the stand-alone modified fast convolution algorithm were to be used in a radio, e.g. cellular, system. In most radio systems, the delay becomes a much more crucial factor which should be reduced as much as possible.

The stand-alone modified fast convolution algorithm, applied to the receiver channelizer, chops the incoming data signal into blocks whose size depends on the percentage of overlap (%overlap) and the length of the Discrete Fourier Transform (DFT). The DFT is subsequently performed. The truncated filter response, that is the number of filter coefficients ($N_{coefficients}$) is less than the length of the DFT ($N_{DFT}$), is implemented directly in the frequency do main. This is accomplished by multiplying the filter coefficients with the selected output bins of the DFT. The result is then processed by an Inverse Discrete Fourier Transform (IDFT) of equal length to the truncated filter as a means to recover the time domain samples of the desired channel. The blocks are then overlapped, depending on the %overlap, and combined. The combination is either a process of adding the overlapped section, overlap and add, or discarding the overlapped section, overlap and save. Note that overlap/add and overlap/save can be considered two extremes, and there are techniques known in the art that lie in-between these two.

The truncation of the frequency response in the stand-alone modified fast convolution algorithm distinguishes it from the standard fast convolution approach. It causes the circular convolution algorithm to now only approximate linear convolution, although with carefullly chosen coefficients the error can be kept small. Truncation of the frequency response also performs decimation by a factor of ($N_{coefficients}/N_{DFT}$), and the frequency conversion is completed by centering the truncated filter coefficients on the wanted channel.

The truncated frequency response also causes a dramatic reduction in the computational complexity in the channel specific parts of the algorithm, that is everything but the DFT. The number of multiplications needed to implement the frequency filter and the size of the IDFT are reduced by approximately a factor of ($N_{coefficients}/N_{DFT}$). The stand-alone modified fast convolution algorithm can also be applied to the transmitter de-channelizer, containing all the same attributes;

Other reductions in complexity that can be applied to standard fast convolution algorithm, can also be applied here to the stand-alone modified fast convolution algorithm. For example, the DFT is a critical block in the operation. For efficiency reasons it is usually implemented in the form of a Fast Fourier Transform (FFT). Additionally two real data blocks can be processed at the same time in one complex DFT processor. Some extra adders and memory are then needed for post-processing. This is more efficient than using two dedicated real DFTs.

Computational savings can also be made in the DFTs through the use of pruning, since only a part of the DFT outputs needs to be calculated. Pruning refers to the process of cutting away branches in the DFT that do not affect the output. The output points that are not needed are never computed.

A computational reduction can also be achieved if the complex multiplication of the filter frequency response is replaced by real multiplication and a subsequent circular shift of the IDFT output block of data before it is combined to form the time domain samples of the desired channel. The amount of circular shift depends only on the %overlap and the length of the IDFT.

A problem still exists with the above-identified systems, especially when the reception and transmission of many channels is necessary simultaneously. As illustrated above, the choice of a digital channelizer, employed from a few channels up to a large number of channels; is very dependent upon the target radio communication system or systems. Invariably a trade-off between computational cost flexibility and acceptable delay based on the radio system's requirements will make the ultimate decision of which wideband channelizer algorithm to choose. There is still room to improve these channelizer/dechannelizer structures in terms of computational cost, flexibility and acceptable delay so that they may be better suited for use in systems with many channels.

A solution to the above-described problems in the art is introduced in "Digital Channeliser and De-Channeliser," by R. Hellberg, the entirety of which is incorporated by reference herein. Therein, a modified fast convolution algorithm is described which efficiently handles the problems associated with conventional channelizers/de-channelizers (i.e., the problems with computational cost, flexibility and acceptable delay with respect to designing those systems to handle multiple channels simultaneously).

The modified fast convolution algorithm, as described in "Digital Channeliser and De-Channeliser," by R. Hellberg, is considered to be a very efficient channelization/de-channelization algorithm in terms of power consumption, die area and computational complexity for more than a few channels. It is also a very flexible algorithm in terms of designing it for the combination of different system parameters, sampling frequency, channel bandwidth, channel separation and bit rate. The technique is therefore a very suitable channelization/de-channelization algorithm for a wide variety of radio communication systems.

However, the modified fast convolution algorithm has a restriction in part of the algorithm. This part involves the placement of the truncated frequency filter coefficients. This filter placement restriction limits the flexibility of the architecture. For example, in narrow band radio communication systems (i.e., DAMPS, PDC, LMR, satellite, etc.) it may mean that not every frequency channel can be correctly channelized (i.e., not every channel can be channelized/de-channelized). As a result, dynamic channel allocation, frequency hopping and low reuse factors are necessarily affected.

As discussed above, a basic problem with the modified fast convolution algorithm is concerned with only part of the algorithm. In the case of the channelizer, this part concerns the selection of the bins that will be subsequently multiplied by the frequency filter coefficients and in the case of the de-channelizer, this part concerns the insertion of the bins, after they have been multiplied by the frequency filter coefficients. FIGS. 4A and 4B illustrate the modified fast convolution algorithm being applied to a channelizer and de-channelizer, respectively. In FIG. 4A, an input signal 405 is provided to the channelizer. The input signal 405 is a stream of data coming from a prior process, such as an ADC.

The data stream 405 is first processed by the η% overlap Block generator 410. This process is based on the amount of percentage overlap, the size of the FFT and the type of overlap, that is overlap/add or overlap/save as discussed below. In the case of overlap/add, the data stream is chopped into non-overlapping sections of length $N_{FFT}*(1-\eta)$, and padded with $N_{FFT}*\eta$ zeros to form a single block. In the case of overlap and save the data is chopped into blocks of length $N_{FFT}$, which have an overlap with the previous block given by a length of $N_{FFT}*\eta$.

The resulting blocks consist of real data only, and can then be multiplexed by multiplexer 420 in a number of different ways to form a complex signal 425 for input into the FFT algorithm, e.g. z(t)=x(t)+j*y(t), where x(t) and y(t) are two consecutive blocks. The second sequence y(t) may also be rotated to save on memory. Although the multiplexer stage is not necessary, it increases the efficiency of the FFT algorithm.

The FFT algorithm is then completed in block 430. As a result of pipeline FFT processing, the output 435 of the FFT is not in the correct order. Therefore, the bin select and extract block 440 must compensate for this by reordering the output sequence and only selecting the bins needed. The number of bins needed depends on the number of filter frequency coefficients 460. The select and extract bins block 440 extracts from the selected bins the two actual results, X(k) and Y(k), from the FFT output (i.e., Z(k), where Z(k)=A(k)+jB(k)).

As a result, the X and Y blocks are now ordered in the same order as they were when multiplexed. The blocks are then multiplied by multiplier 450 with the filter frequency coefficients 460. The number of coefficients 460 is selected to be less than the length of the FFT. An inverse Discrete Fourier Transform (inverse-DFT or IDFT) 470 is then completed on the result of the previous multiplication.

The blocks are then inserted into the η% overlap block combiner 480. The combination operation depends on the %overlap of the blocks and whether an overlap/save or an overlap/add is being employed. For either overlap and add or overlap and save, the blocks are overlapped with thee previous block by a length equal to $N_{IDFT}*\eta$. For overlap and add, the overlapping part of the block is added to the previous block's corresponding overlapping part, while for overlap and save the overlapping part of the block is simply discarded. For both overlap and add and overlap and save there are no operations performed on the non-overlapped part of the block.

FIG. 4B illustrates the modified fast convolution algorithm as applied to a transmitter. The input signal is a stream of data 402 coming from a prior process, such as the modulation process. In contrast to FIG. 4A, the input data stream is specific to one channel, rather than a stream combining many channels.

The data stream 402 is first processed by the η% overlap Block generator 404. This process is largely based on the amount of percentage overlap, the size of the DFT and the type of overlap, that is overlap/add or overlap/save. In the case of overlap/add, the data stream is chopped into non-overlapping sections of length $N_{FFT}*(1-\eta)$, and padded with $N_{FFT}*\eta$ zeros to form a single block. In the case of overlap and save the data is chopped into blocks of length $N_{FFT}$, which have an overlap with the previous block given by a length of $N_{FFT}*\eta$.

A Discrete Fourier Transform (DFT) 406 is then completed on the result of the previous operation. Because it is not a critical operation, the size of the DFT, $N_{DFT}$, does not have to be a power of 2. One skilled in the art will recognize that the DFT 406 could, in the alternative, be implemented as an FFT. As contrasted with the receiver in FIG. 4A, the DFT 406 structure is small and the IFFT 416 structure is large, the opposite of the receiver.

The block is then multiplied 408 with the respective filter frequency coefficients 412. The frequency filter coefficients 412 are equivalent to the FFT of the impulse response.

The results of the multiplication are then input into the Insert Bin block 414. The bins are inserted into the Inverse Fast Fourier Transform (IFFT) 416 in the following symmetrical way: $Z(k_{start}+k)=X(k)$ and $Z(N_{IFFT}-k_{start}-k)=X'(k)$, where $k_{start}$ represents the location where the first bin of the channel is to be inserted, and k is an integer from 0→N−1. The bins to be inserted for one channel are given by X(0)→X(N−1). These complex values come from the multiplier 408. X'(k) represents the complex conjugate of X(k). The IFFT in which they are inserted into has $N_{IFFT}$ possible complex bins, numbered from $Z(0) \rightarrow Z(N_{IFFT}-1)$.

The result of inserting the block in a symmetrical way is that only the real output from the IFFT contains the desired result. There is no useful information in the imaginary output. Since the only useful information lies in the real output from the IFFT, the overlap block combiner 424 will only have to perform a very simple operation. This is important since the overlap combiner 424 is operating at the highest sampling frequency and could otherwise have a significant effect on power consumption and die size.

An alternative method of inserting bins is to multiplex two blocks of data from the same channel so that the first block X(k) comes out as the real output and the second block Y(k), comes out as the imaginary output of the IFFT. The following equations illustrate this technique: $Z(k_{start}+k)=X(k)+jY(k)$ and $Z(N_{IFFT}-k_{start}-k)=X'(k)+jY'(k)$.

The bins from all channels are then inserted into the IFFT 416 and the IFFT algorithm is then completed. The blocks are then de-multiplexed 418 to form a real signal. 422 for input into the η% overlap block combiner 424.

The blocks are combined 424 depending on their %overlap and whether an overlap/save or overlap/add is being employed. For either overlap and add or overlap and save, the blocks are overlapped with the previous block by a length equal to $N_{IDFT}*\eta$. For overlap and add, the overlapping part of the block is added to the previous blocks corresponding overlapping part, while for overlap and save the overlapping part of the block is simply discarded. For both overlap and add and overlap and save there are no operations performed on the non-overlapped sections.

FIG. 5 illustrates the operation of the η% overlap block generator of FIGS. 4A and 4B. As indicated above, this process is based on the amount of percentage overlap, the size of the FFT and the type of overlap, that is overlap/add or overlap/save. In the case of overlap/add 520, the data stream 510 is chopped into non-overlapping sections 531, 541, of length $N_{FFT}*(1-\eta)$, and padded with $N_{FFT}*\eta$ zeros 532, 542, to form consecutive blocks 530, 540. In the case of overlap and save 550 the data stream 510 is chopped into blocks 560, 570, of length $N_{FFT}$, which have an overlap 580 with the previous block given by a length of $N_{FFT*1\ \eta}$.

FIG. 6 illustrates the output data stream as processed by the η% overlap block combiner of FIGS. 4A and 4B. For either overlap and add 620 or overlap and save 650, the blocks 630, 640, 660, 670, are overlapped with the previous block by a length equal to $N_{IDFT*}\eta$. For overlap and add 620, the overlapping part 641 of the block 640 is added 625 to the previous block's 630 corresponding overlapping part 631, while for overlap and save 650 the overlapping part 661, 671, of the block 660, 670, respectively, is simply discarded 655.

As indicated above, a problem with the above-described modified fast evolution algorithm concerns placement of the filter frequency coefficients on the output bins of the FFT 430, in the case of a receiver, and on the output bins of the DFT 406, in the case of a transmitter. For a receiver, the bins selected by the select and extract bins block 440 have a defined center bin. Typically, this is considered the center bin of the frequency filter. This center bin can, theoretically, be placed on any output bin from the FFT. However, in reality, this can only be done with changes to the basic algorithm.

In "A Flexible On-Board Demultiplexer/Demodulator," S. Joseph Campanella et al., Proceedings of the 12th AIAA International Communication Satellite Systems Conference, 1988, pp. 299–303, the frequency filter placement problem is avoided by using a regular frequency grid and a large sized FFT. The regular frequency grid is a characteristic of many radio systems, but in the future when many radio systems operate together simultaneously or for new radio systems, this may not be the situation. The large sized FFT causes unacceptably long delays for many radio systems. Additionally, when it comes to optimizing a system, this placement problem can be seen as an unnecessary restriction.

The problem is that the center bin of the frequency filter cannot be placed on just any FFT output bin, when using the modified fast convolution algorithm. The number of restrictions, that is the number of FFT output bins that cannot be used, is dependent on the percentage of overlap. For example, if 50% overlap is chosen then the placement of the filter is restricted to half the possible FFT output bins. Likewise, for 25% overlap then the filter placement is restricted to a quarter of the possible FFT output bins.

This filter placement restriction limits the flexibility of the architecture because the filter cannot be centered on every bin (i.e., the channel will be centered on a different bin to that of the center bin of the frequency filter). Some of the possible effects include asymmetrical filtering when the channel and filter bandwidths are similar, and the channel will still have some residual frequency modulation. Both of these side effects could possibly be corrected with additional signal processing (i.e., additional computation and power consumption).

A more drastic effect occurs if the channel bandwidth is narrow with respect to the bin spacing of the FFT. In this case some frequency channels will be unable to be chosen, limiting the algorithm's flexibility. For example, dynamic channel allocation requires the availability of every channel across a specified bandwidth, low reuse factors mean that adjacent or nearly adjacent channels are required in the same transmitter or receiver. The filter placement problem therefore limits the flexibility of the modified fast convolution algorithm.

The problem of restricted filter placement across the possible output bins of the FFT reduces flexibility and introduces the need for additional processing to overcome the above-identified side effects. The problem can be illustrated by considering the receive channelizer of FIG. 4A based on the 50% overlap and save modified fast convolution technique. The input signal frequency is chosen to exactly lie on one FFT bin:

$$Z(n) = \cos(2 * pi * f_{sig} * n / N_{FFT})$$

where $f_{sig}$=integer 0–>$N_{FFT}$–1.

In the case of 50% overlap, then either an even number of cycles or an odd number of cycles will be contained within $N_{FFT}$ points. Therefore, the output of the FFT 435, Z(k), will change between the successive blocks presented to the FFT 430 as illustrated in the Table 1 below (note that the results have been normalized to one).

TABLE 1

| Block | $Z(f_{sig})$<br>$f_{sig}$ = even | $Z(f_{sig})$<br>$f_{sig}$ = odd |
|---|---|---|
| 1 | 1 | 1 |
| 2 | 1 | −1 |
| 3 | 1 | 1 |
| etc. | | |

The result of the FFT 430 is then multiplied by the truncated frequency response coefficients, $k_0 \to k_{Niffi}$, and presented to the IDFT 470. The DC bin of the IDFT 470 corresponds to the bin which is defined as the center of the selected bins. For example, the DC bin, $IDFT\_BIN_{DC}$, can be defined as the $(N_{IDFT}/2)^{th}$ bin (as illustrated in FIG. 7). The DC bin can also be defined in other ways.

The DC bin of the IDFT can either be centered on an odd or even bin of the larger FFT, $FFT\_BIN_{center}$. First consider the result of the blocks coming out of the IFFT when the $IDFT\_BIN_{DC}$ is centered on an even bin of the FFT, and $f_{sig} = FFT\_BIN_{center}$ for simplicity. The result out of the IDFT will be a DC signal with the values set forth in Table 2 (note that the results have been normalized to one).

TABLE 2

| Block | DC Value |
|---|---|
| 1 | 1 |
| 2 | 1 |
| 3 | 1 |
| 4 | 1 |
| etc. | |

When the blocks are overlapped and saved to form the time domain signal, the result will consist of a continuous DC signal, as expected. If the signal frequency is not equal to the center bin of the IDFT, say $f_{sig}=FFT\_BIN_{center}+1$, the result is, as expected, a sinusoid with a frequency equal to one IDFT bin (see FIG. 8). Therefore, when the center bin of the IDFT is located on an even bin of the FFT, then the modified fast convolution algorithm operates as expected.

Now consider the situation where the IDFT is centered on an odd bin of the FFT, and $f_{sig}=FFT\_BIN_{center}$ for simplicity. The result out of the IDFT consists of the values set forth in Table 3 (note again that the results have been normalized to one).

TABLE 3

| Block | DC Value |
|---|---|
| 1 | 1 |
| 2 | −1 |
| 3 | 1 |
| 4 | −1 |
| etc. | |

When the blocks are overlapped and saved to form the time domain signal, the result will not be a continuous DC signal, but rather a square wave has resulted. This again can be illustrated if the signal frequency is not equal to the center bin of the IDFT, say $f_{sig}$=FFT_BIN$_{center}$+1. The result is shown in FIG. 9 and is not as expected, i.e. a sinusoid with a frequency of the one IDFT bin, rather it looks as though it has been phase modulated at each boundary.

The problem is caused by adjacent blocks from the IDFT not having phase continuity when the overlap and save operation occurs. The same analysis could be applied to any percentage of overlap. For example with 25% overlap, three out of four cases will exhibit the phase continuity problem. Therefore the center bin of the frequency filter can- only be placed on every fourth bin out of the FFT algorithm.

SUMMARY

The present invention seeks to enhance the above-described modified fast convolution algorithm in order to increase the flexibility of the algorithm. In an exemplary embodiment of the present invention, a block compensator is inserted into the channelizer/de-channelizer processing chain. The block compensator corrects the phase continuity problem associated with modified fast convolution algorithm to thereby allow unrestricted filter placement. As a result, the flexibility of the modified fast convolution algorithm is increased whilst only marginally increasing computational requirements.

In a second exemplary embodiment, the, phase continuity problem is corrected by combining a frequency shift in the frequency domain with a compensatory frequency shift in the time domain. This approach will also provide phase continuity, irrespective of the percentage of overlap.

BRIEF DESCRIPTION OF THE DRAWINGS

The above objects and features of the present invention will be more apparent from the following description of the preferred embodiments with reference to the accompanying drawings, wherein.

DETAILED DESCRIPTION

Figure 1:
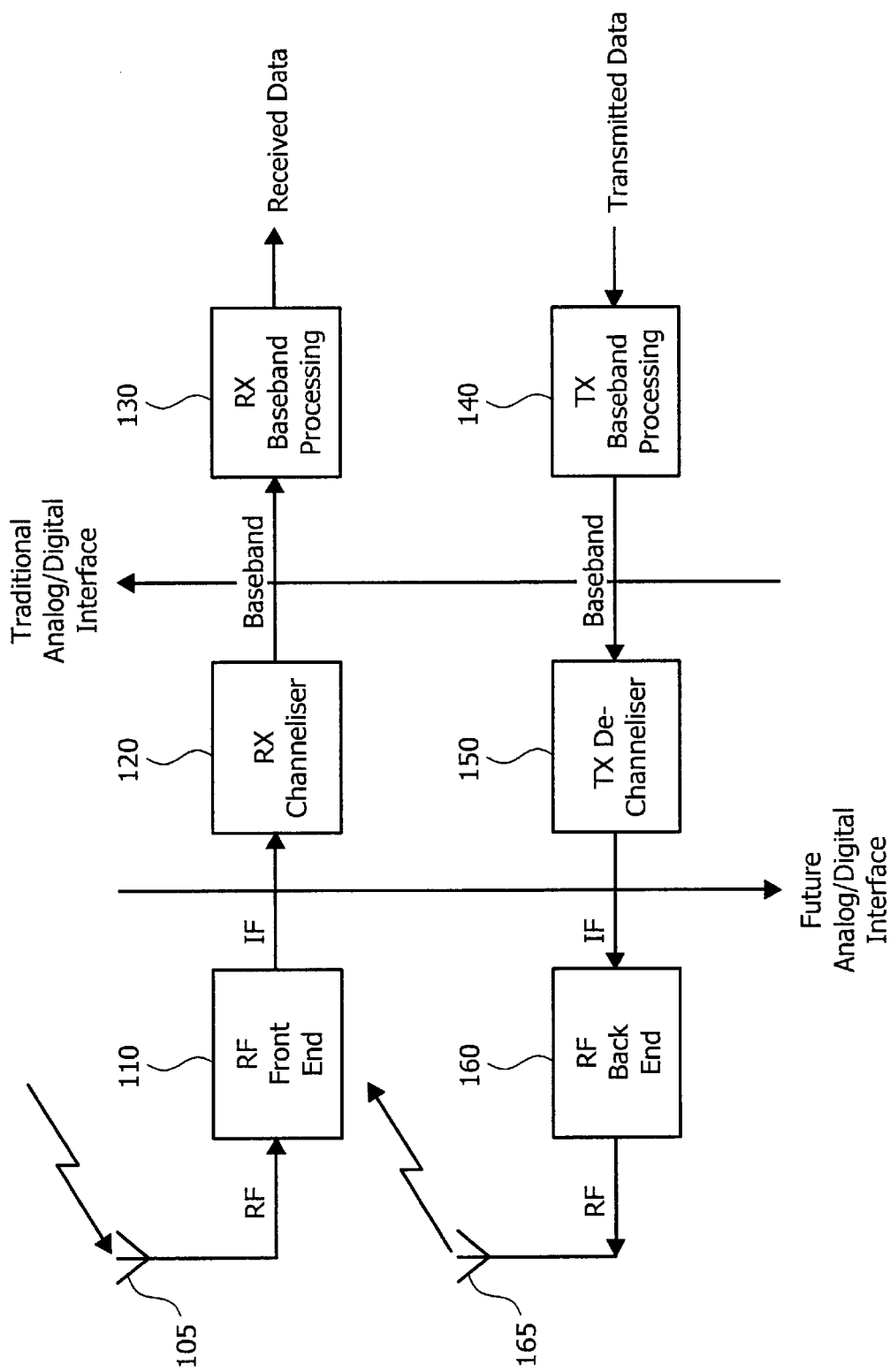
FIG. 1 illustrates a conventional transmitter and receiver.
Figure 2:
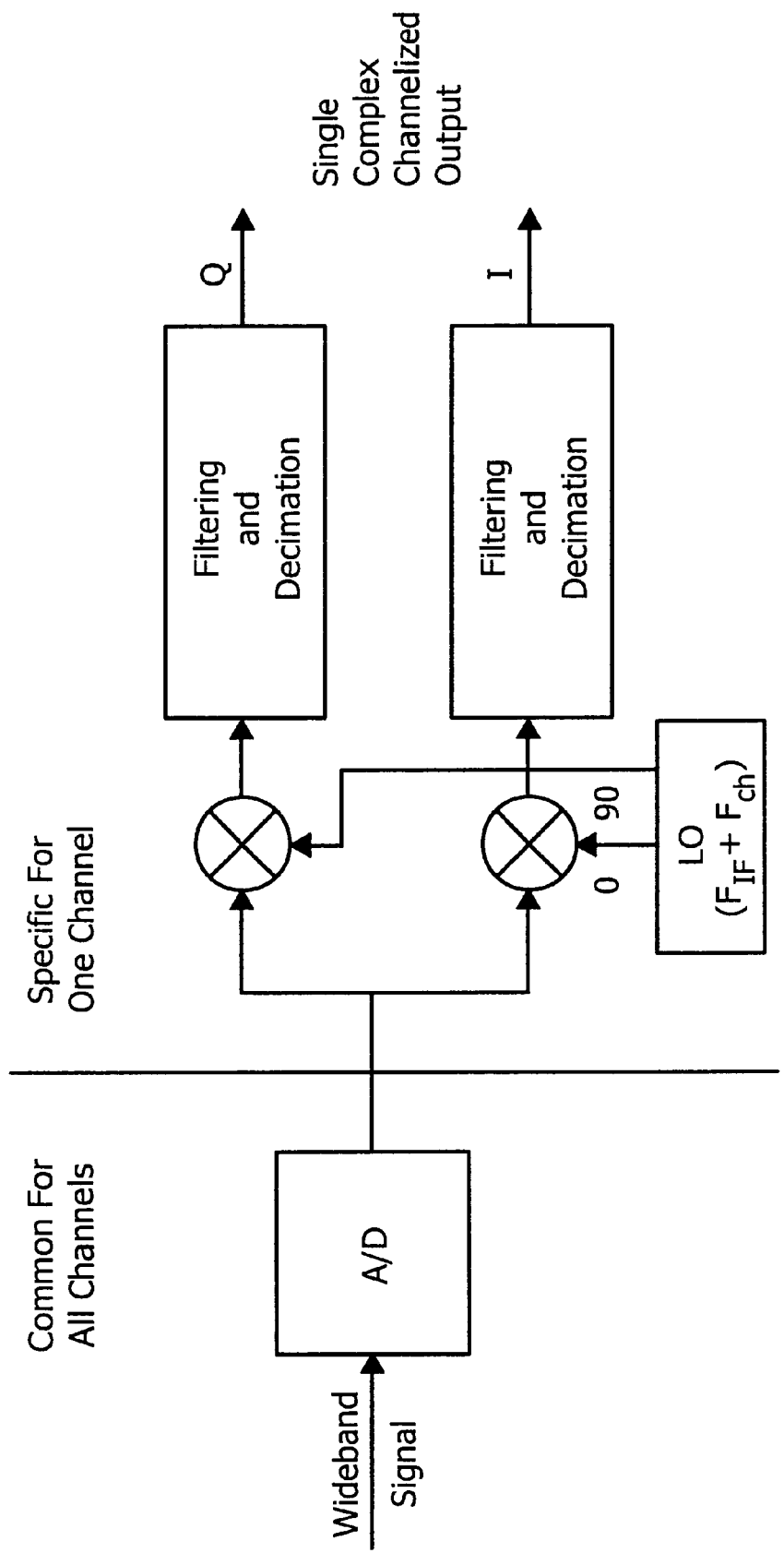
FIG. 2 illustrates a conventional IQ-demodulating digital receiver.
Figure 3:
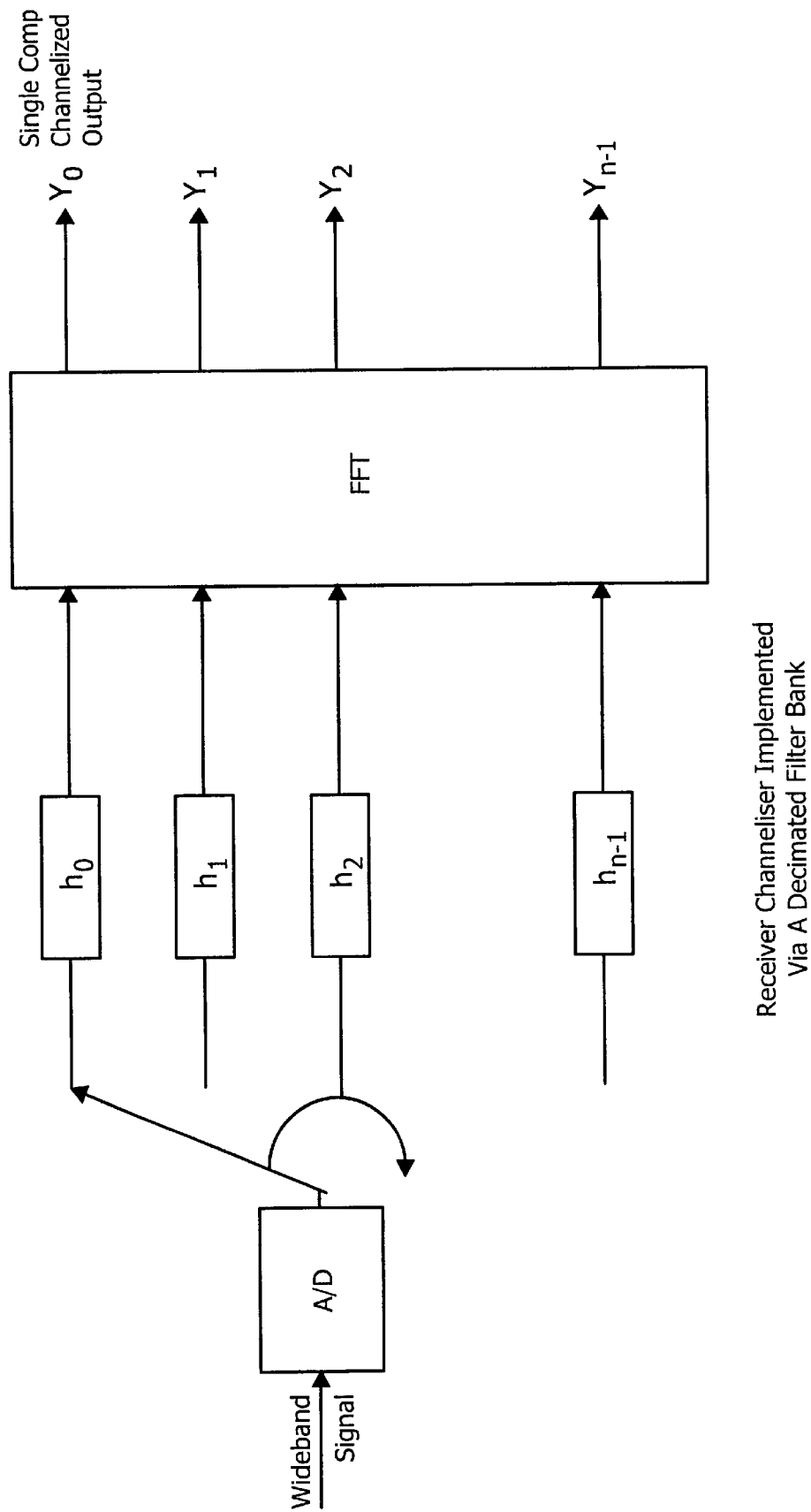
FIG. 3 illustrates a conventional decimation filter bank.
Figure 4A:
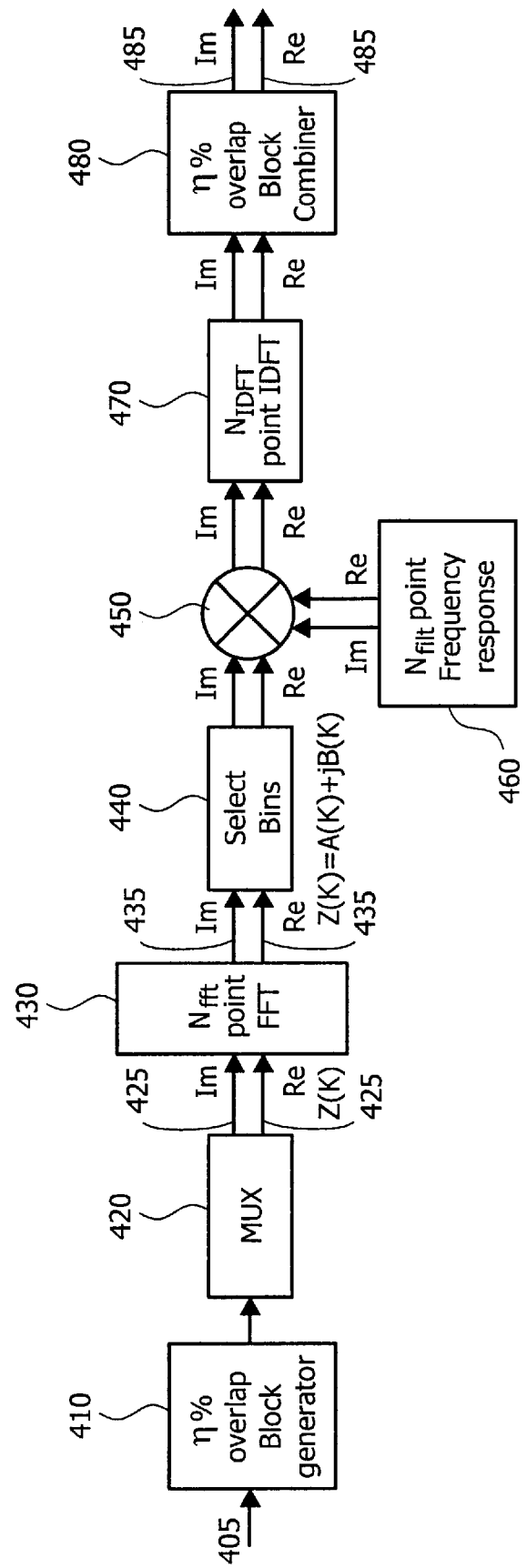
FIG. 4A illustrates the modified fast convolution algorithm applied to a channelizer;.
Figure 4B:
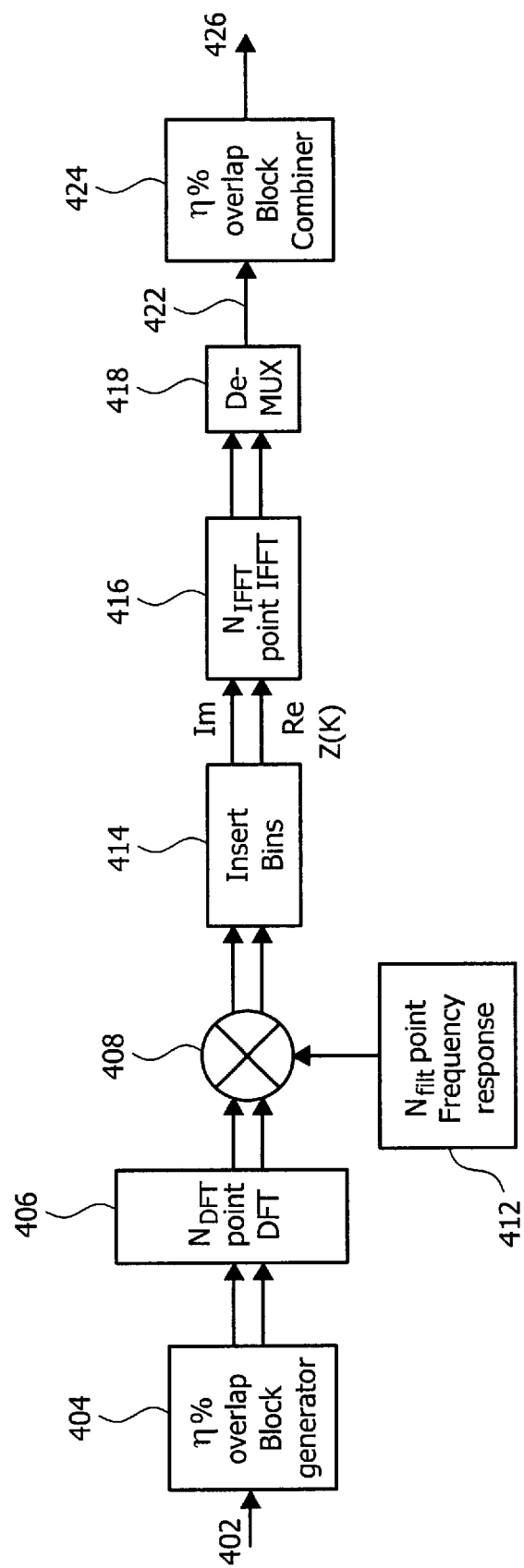
FIG. 4B illustrates the modified fast convolution algorithm applied to a de-channelizer.
Figure 5:
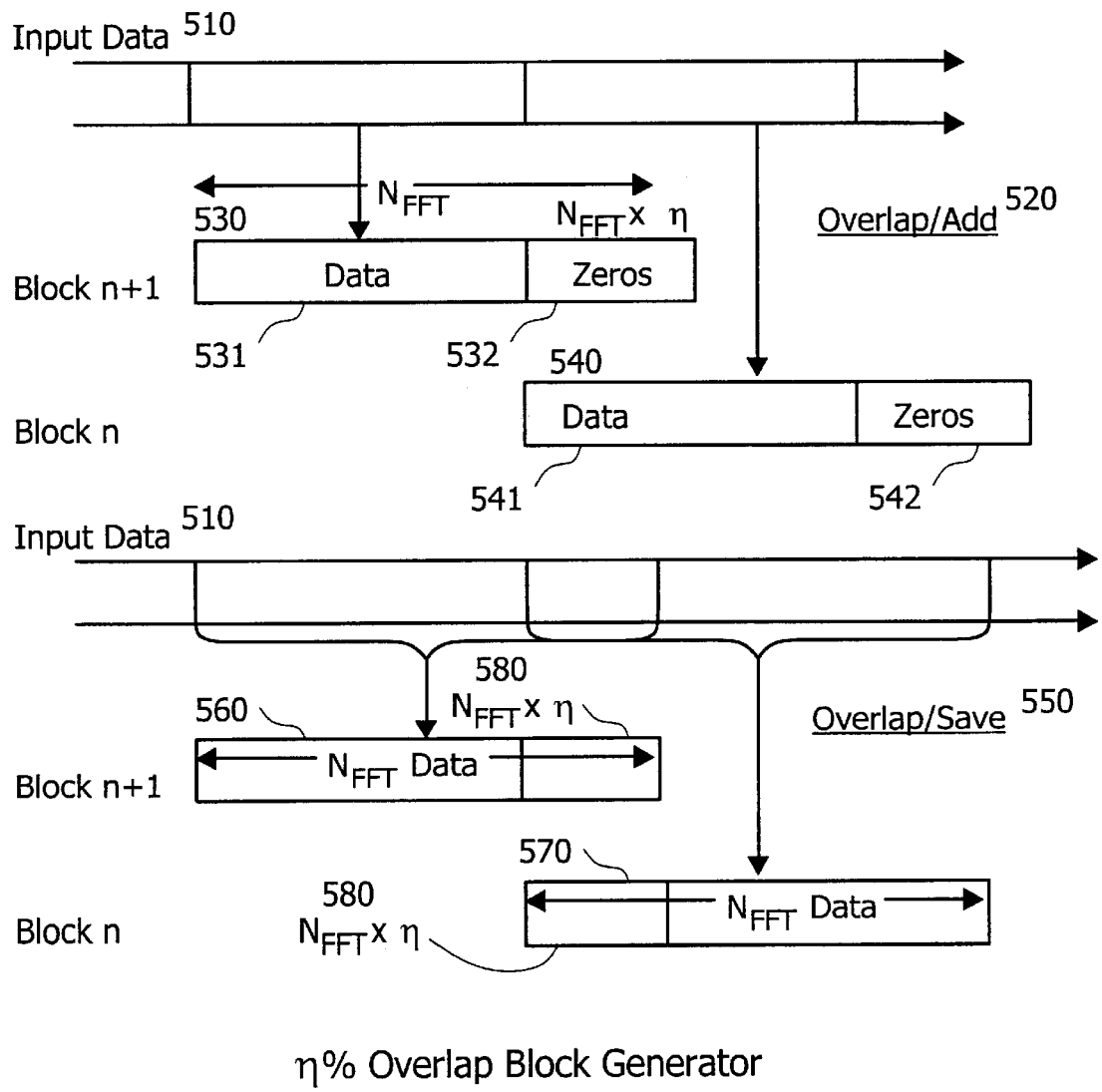
FIG. 5 illustrates the η% overlap block generator.
Figure 6:
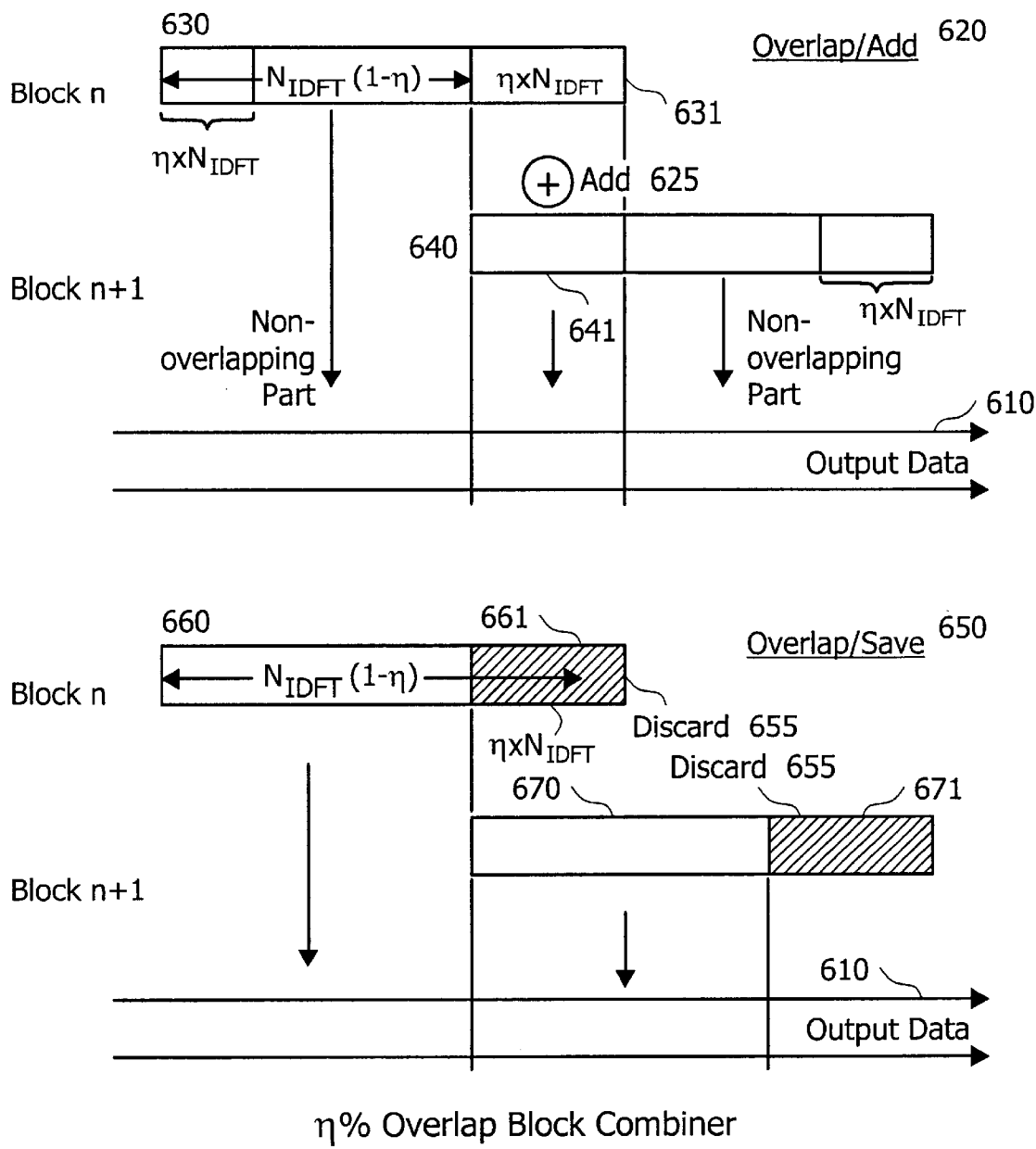
FIG. 6 illustrates the η% overlap block combiner.
Figure 7:
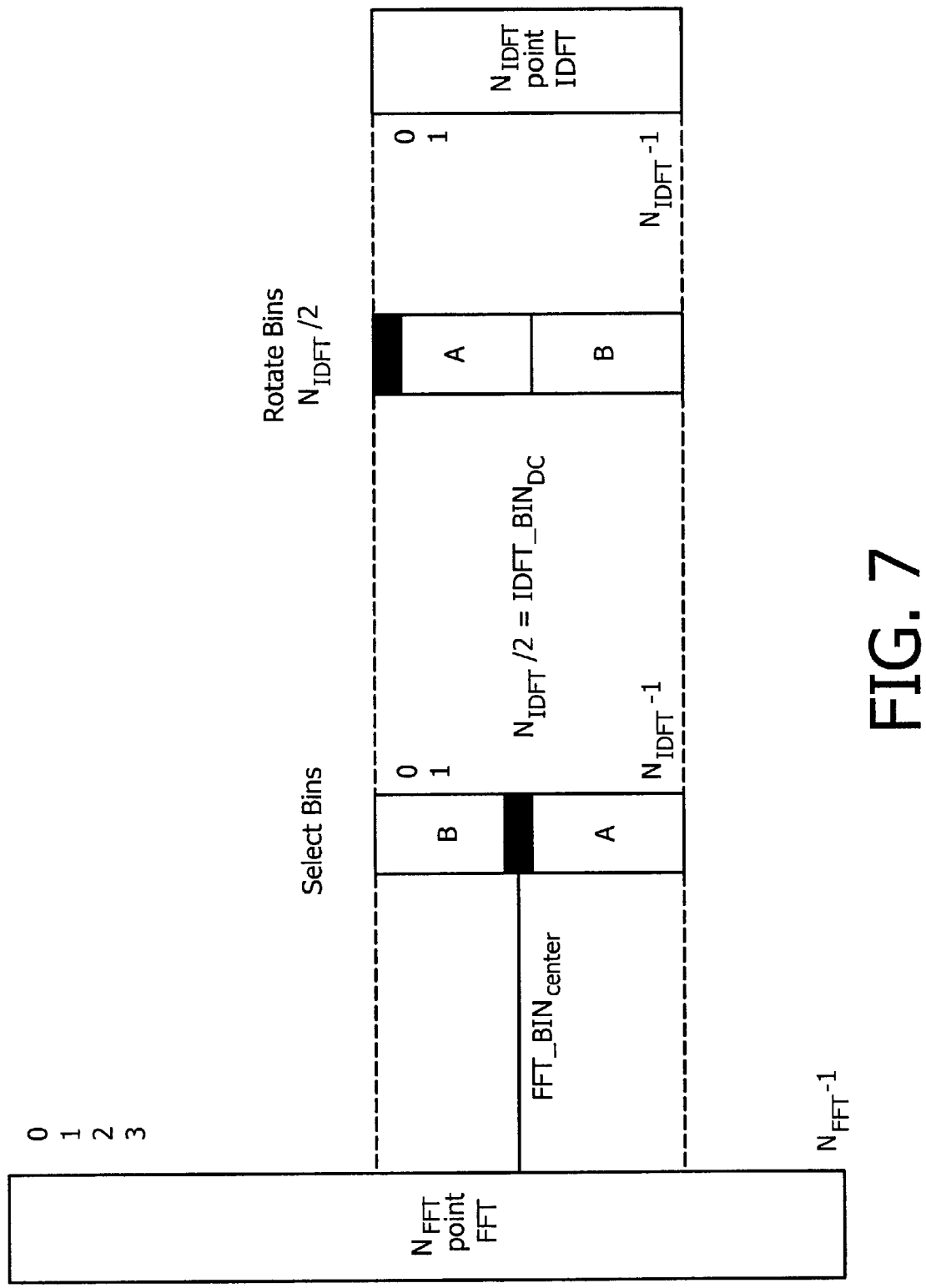
FIG. 7 illustrates the DC bin of the IDFT when it is the $N_{IDFT}/2^{th}$ bin of the selected FFT bins.
Figure 8:
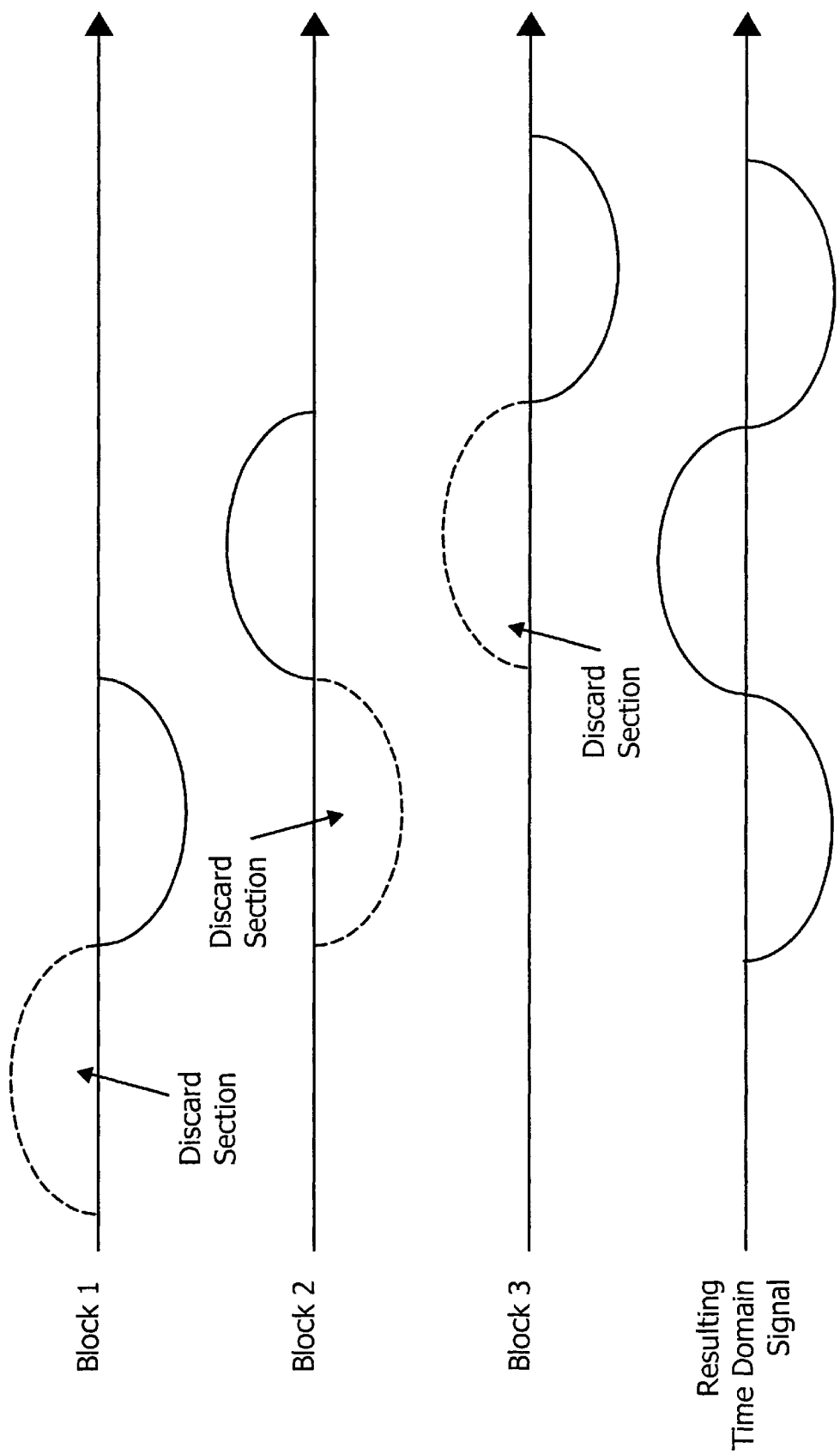
FIG. 8 illustrates the result of placing the center bin of the IDFT on an even bin of the FFT.
Figure 9:
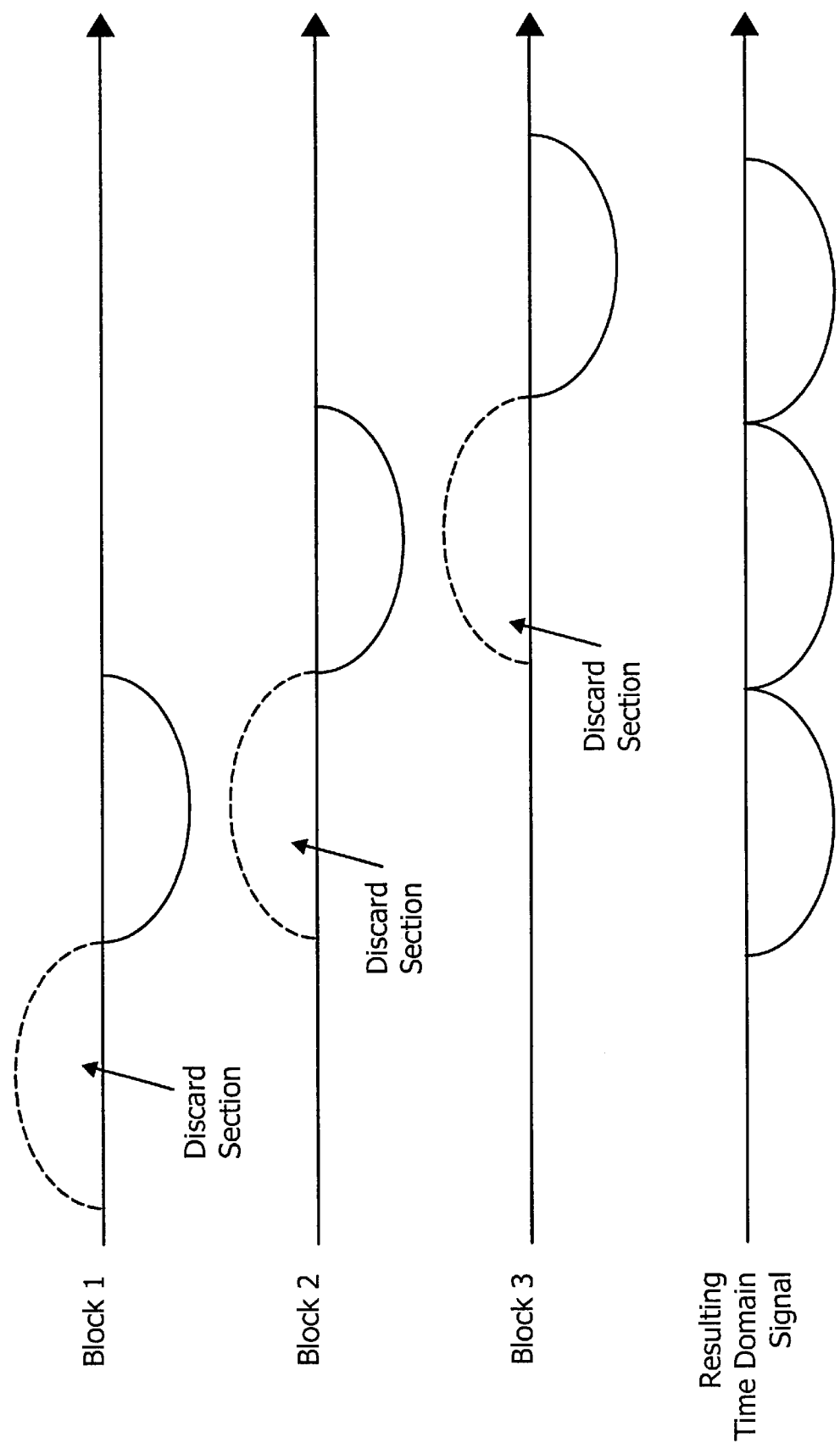
FIG. 9 illustrates the result of placing the center bin of the IDFT on an odd bin of the FFT.
Figure 10:
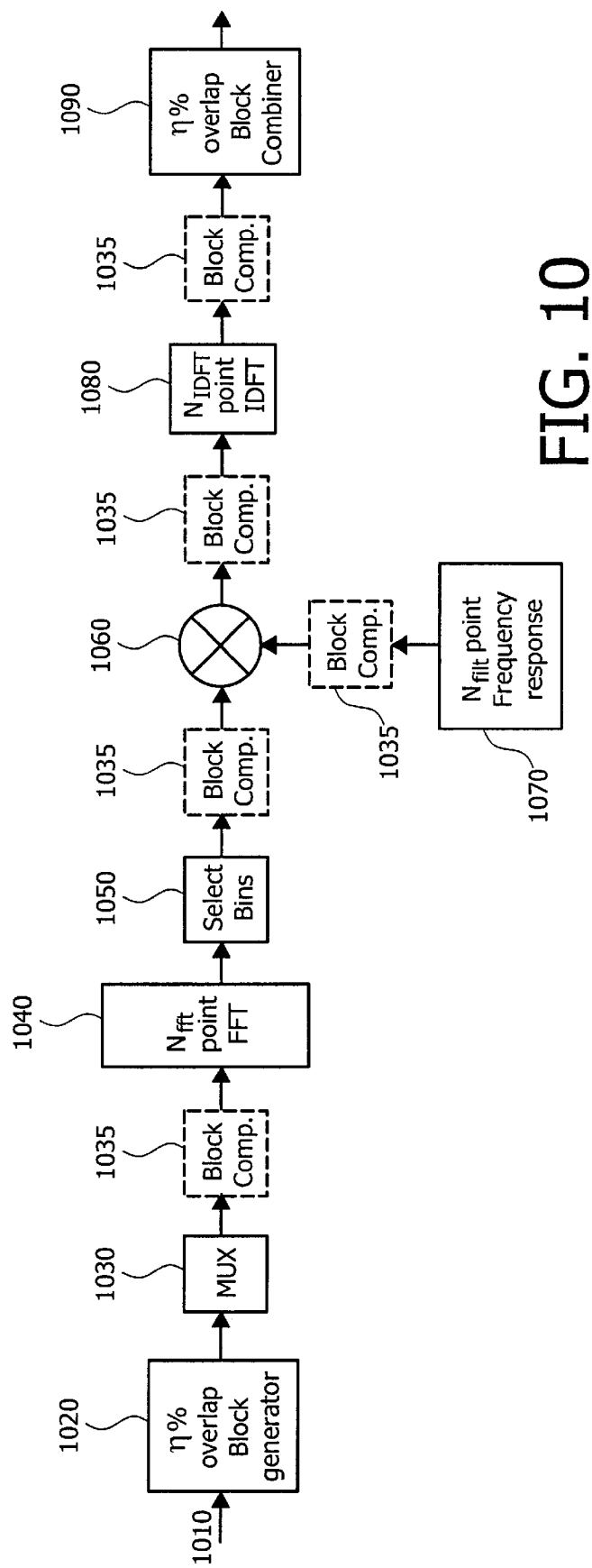
FIG. 10 illustrates the modified fast convolution algorithm applied to a channelizer according to one aspect of the present invention.

FIG. 10 illustrates an exemplary channelizer according to an embodiment of the present invention. In FIG. 10, a data stream 1010 is input to η% overlap block generator 1020. Processing by η% overlap block generator 1020 is dependent upon the amount of percentage overlap, the size of the FFT and the type of overlap, that is overlap/add or overlap/save. In the case of overlap/add, the data stream is chopped into non-overlapping sections of length $N_{FFT}*(1-\eta)$, and padded with $N_{FFT}*\eta$ zeros to form a single block. In the situation of overlap and save the data is chopped into blocks of length $N_{FFT}$, which have an overlap with the previous block given by a length of $N_{FFT}*\eta$.

The blocks consist of real data only, and can then be multiplexed by multiplexer 1030 in a number of different ways to form a complex signal for input into the FFT 1040. Although the multiplexer stage is not necessary, one skilled in the art will appreciate that it increases the efficiency of the FFT algorithm.

The FFT algorithm is then completed in block 1040. One skilled in the art will appreciate that the FFT architecture in block 1040 can take many forms; for example, an efficient implementation for this type of high speed calculation uses the pipeline architecture with a power of 2, hence FFT. As a result of the FFT processing, the output of the FFT 1040 is not in the correct order. Therefore, the bin select and extract block 1050 must compensate for this by reordering the output sequence and only selecting the bins needed. The number of bins needed depends on the number of filter coefficients 1070. The select and extract bins block 1050 extracts from the selected bins the two actual results, X(k) and Y(k), from the FFT output (i.e., Z(k), where Z()=A(k)+jB(k)).

The extraction algorithm will depend on the multiplexing technique employed prior to the FFT. For example, with 50% overlap and add, the second sequence, Y(n) has been rotated $N_{FFT}/2$ points to save on memory. Therefore, to extract the correct X(k) and Y(k) the following equations require implementation:

$$X(k) = \frac{A(k) + A(N-k)}{2} + j\frac{B(k) - B(N-k)}{2}$$

$$Y(k) = \left(\frac{B(k) + B(N-k)}{2} + j\frac{A(k) - A(N-k)}{2}\right) \times (-1)^k$$

Whereas for 25% overlap, the second sequence, Y(n), has been rotated $N_{FFT}/4$ points to save on memory. Therefore to extract the correct X(k) and Y(k) the following equations require implementation:

$$X(k) = \frac{A(k) + A(N-k)}{2} + j\frac{B(k) - B(N-k)}{2}$$

$$Y(k) = \left(\frac{B(k) + B(N-k)}{2} + j\frac{A(k) - A(N-k)}{2}\right) \times (j)^k$$

The X and Y blocks are now ordered in the same order as they were when multiplexed. The blocks are then multiplied by multiplier 1060 with the filter frequency coefficients 1070. The number of coefficients 1070 is selected to be less than the length of the FFT. An inverse Discrete Fourier Transform (inverse-DFT or IDFT) 1080 is then completed on the result of the previous multiplication. Because it is not a critical operation, the size of the IDFT, $N_{IDFT}$, does not have to be a power of 2.

The blocks are then inserted into the η% overlap block combiner 1090. The combination operation depends on the %overlap of the blocks and whether an overlap/save or an overlap/add is being employed. For either overlap and add or overlap and save, the blocks are overlapped with the previous block by a length equal to $N_{IDFT} \times \eta$. For overlap and add, the overlapping part of the block is added to the previous block's corresponding overlapping part, while for overlap and save the overlapping part of the block is simply discarded. For both overlap and add and overlap and save there are no operations performed on the non-overlapped part of the block.

According to an exemplary embodiment of the present invention, a block compensator 1035 is provided in order to compensate for the phase continuity problem associated with the conventional modified fast convolution algorithm. Block compensator 1035 acts to correct the phase of blocks of bins in the frequency domain by multiplying the successive blocks by compensation constants. The compensation constants may or may not change between successive blocks.

The following examples illustrate the block compensation needed in order to correct the phase of the FFT, output blocks for different percentages of overlap. Table 4 illustrates the compensation values needed when 50% overlap is used.

TABLE 4

| Condition | Compensation Constant for Successive Blocks |
|---|---|
| FFT_BIN$_{center}$MOD 2 = 0 | 1  1 . . . |
| 1 | 1  −1 . . . |

As is evident from Table 4, when the center bin is an even bin, all blocks will be multiplied by 1. When the center bin is an odd bin, successive blocks will be multiplied by a 1, −1, 1, −1, etc. Therefore, one skilled in the art will appreciate that the multiplication needed in order to overcome the phase continuity problem for a 50% overlap is trivial (i.e., the blocks will be multiplied by either all 1's or by alternating 1's and −1's).

Table 5 illustrates the block compensation implemented when 25% overlap is used.

TABLE 5

| Condition | Compensation Constant for Successive Blocks |
|---|---|
| FFT_BIN$_{center}$MOD 4 = 0 | 1  1  1  1 . . . |
| 1 | 1  j  −1  −j . . . |
| 2 | 1  −1  1  −1 . . . |
| 3 | 1  −j  −1  j . . . |

When the percentage of overlap is 25%, there are four different compensation sequences with which the blocks may be multiplied. For example, when modulus 4 is one, successive blocks are multiplied by a compensation constant of 1. When the modulus 4 is 2, successive blocks are multiplied by a 1, j (i.e., the imaginary component), −1, −j, 1, j, etc. As with the 50% overlap, the multiplication needed for 25% overlap is trivial.

Table 6 illustrates the general case of η% overlap, where 1/η=integer.

TABLE 6

| Condition | Compensation Constant for Successive Blocks |
|---|---|
| FFT_BIN$_{center}$MOD 1/η = 0 | 1  exp(−j × 2π × η × 0) . . . |
| 1 | 1  exp(−j × 2π × η × 1) . . . |
| . | . . |
| . | . . |
| . | . . |
| (1/η) − 1 | 1  exp(−j × 2π × η × ((1/η) − 1)) . . . |

As is evident from FIG. 10, the compensation can be performed in a variety of locations in the channelizer. However, only one of the locations, illustrated in FIG. 10, is selected. The location is preferably selected as the point of lowest computation; therefore, the best locations are those after the FFT 1040. The block compensator may be placed before the FFT 1040, but, due to the large block size before the FFT 1040, it would less advantageous.

Figure 11:
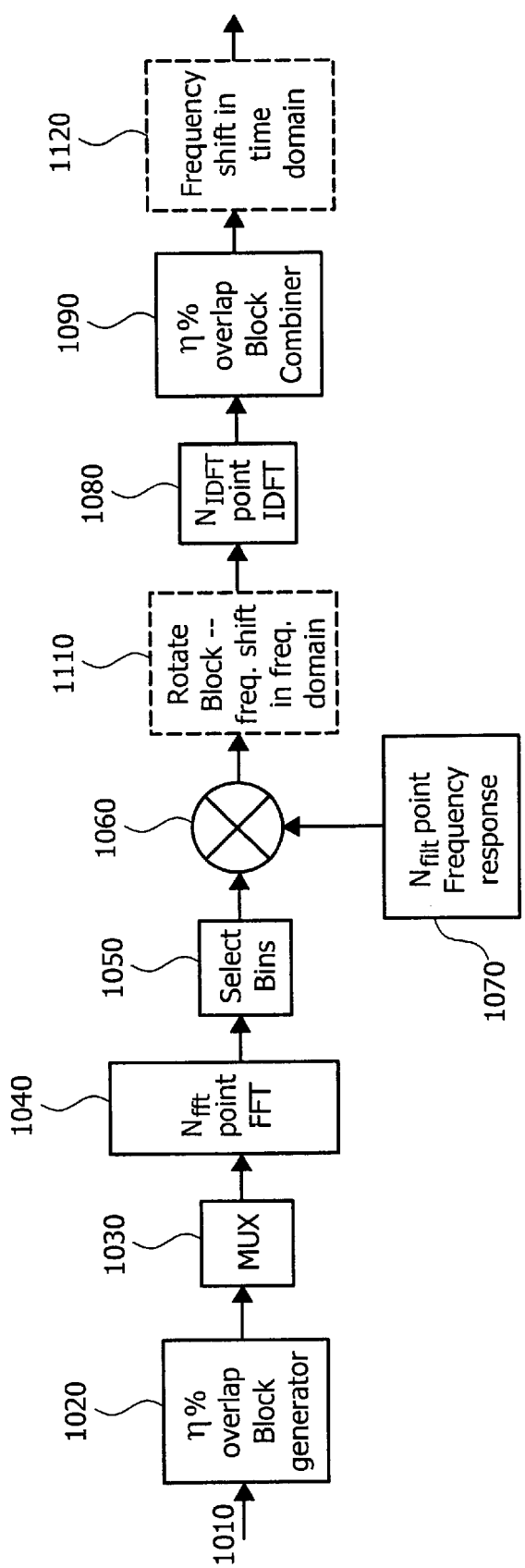
FIG. 11 illustrates the modified fast convolution algorithm applied to a channelizer according to a second aspect of the present invention.
Figure 12:
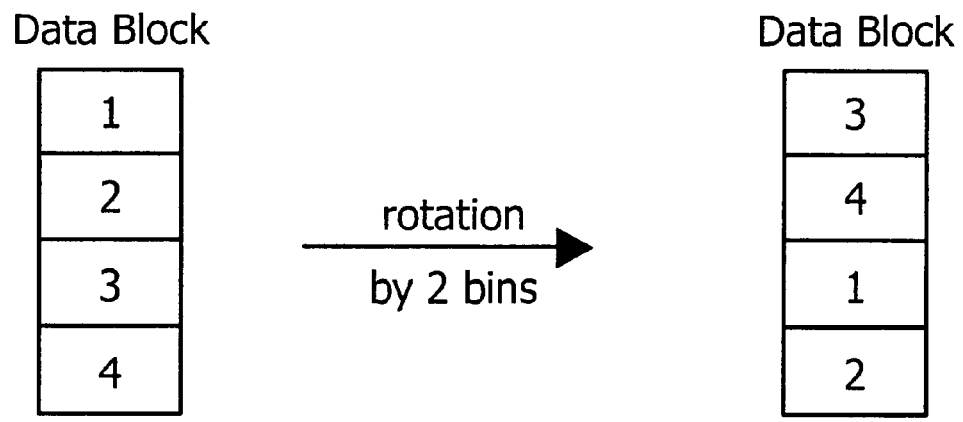
FIG. 12 illustrates the frequency rotation operation of the present invention.
Figure 13:
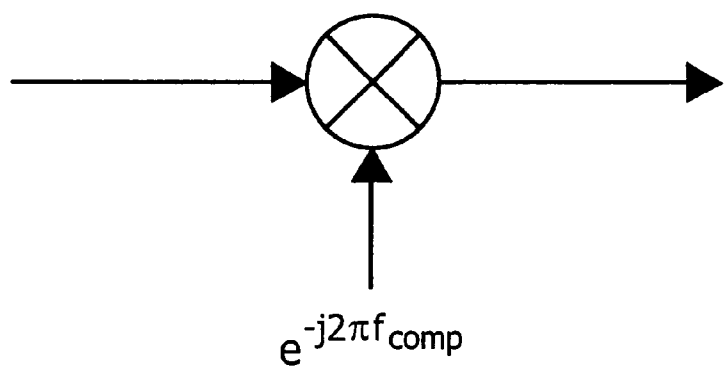
FIG. 13 illustrates the frequency compensation operation of the present invention.

FIG. 11 illustrates the modified fast convolution algorithm applied to a channelizer according to a second embodiment of the present invention. In FIG. 11, a data stream 1010 is processed by the η% overlap block generator 1020, multiplexer 1030, FFT 1040, select bins block 1050 and multiplier 1060 in a manner similar to that described with reference to FIG. 10. According to the present embodiment, however, the multiplied bins from multiplier 1060 are input to a frequency shifter 1110. Therein, the blocks are frequency translated in the frequency domain. The frequency translation is accomplished by circularly rotating the block of data bins by an amount given by FFT_BIN$_{center}$ MOD 1/η. FIG. 12 illustrates the process of circularly rotating a data block by 2 data bins. As set forth above, the amount of circular rotation is generally given by:

FFT_BIN$_{center}$MOD 1/η bins.

A compensatory frequency in the time domain is then required after the overlap/save or overlap/add operation of η% overlap block combiner 1090 to remove or partly remove the frequency offset generated by the circular shift in the frequency domain. This frequency compensation is performed by frequency compensator 1120 in FIG. 11. As will be appreciated by one skilled in the art, the frequency compensation in the time domain can be implemented with a complex multiplier as is illustrated in FIG. 14. In the normal case where the frequency compensation in the time domain should compensate the frequency offset generated by the circular shift in the frequency domain, the frequency translation requires multiplication with a frequency of $$f_{comp}=(FFT\_BIN_{center} MOD\ 1/\eta)/N_{IDFT}\ bins.$$

It is evident that the multiplication operation according to this embodiment is not as trivial as in the first embodiment described above. However, a complex multiplier may be already part of the architecture, and therefore no additional computational cost would be required.

Although the above-described embodiments have been described with reference to a channelizer, one skilled in the art will appreciate that the present invention applies equally well to a de-channelizer.

As a result of the present invention, the modified fast convolution algorithm can center the frequency filter coefficients on any of the output bins of the FFT. Removing the filter placement restrictions associated with the conventional modified fast convolutional algorithm increases the flexibility of the architecture and avoids additional signal processing to compensate for side effects that would have otherwise occurred. The present invention increases the flexibility of the modified fast convolution algorithm whilst only marginally increasing the computational requirements. This algorithm is a very suitable technique for digital channelization and de-channelization in radio communication systems that will support multiple standards with more than a few channels activated at any, one time.

The foregoing has described the principles, preferred embodiments and modes of operation of the present invention. However, the invention should not be construed as being limited to the particular embodiments discussed above. Thus, the above-described embodiments should be regarded as illustrative rather than restrictive, and it should be appreciated that variations may be made in those embodiment by workers skillet in the art without departing from the scope of the present invention as defined by the following claims.

What is claimed is:

1. A system for enhancing a modified fast convolution algorithm applied to a channelizer, said system comprising:
   a $\eta\%$ overlap block generator for converting a received data stream into blocks;
   means for performing a $N_{DFT}$-point Discrete Fourier Transform on said blocks to form bins;
   means for selecting and extracting bins;
   a multiplier for multiplying the selected and extracted bins with frequency filter coefficients and outputting multiplied bins;
   means for frequency shifting the multiplied bins in a frequency domain;
   means for performing a $N_{IDFT}$-point Inverse Discrete Fourier Transform on said frequency shifted bins and outputting a result;
   a $\eta\%$ overlap block combiner for performing an overlap/save or overlap/add operation on said result; and
   means for frequency shifting an output of the $\eta\%$ overlap block combiner in a time domain.

2. The system of claim 1 wherein said means for frequency shifting in the frequency domain is a circular rotator which performs a circular rotation of said multiplied bins.

3. The system of claim 2 wherein values of said circular rotation depend on the percentage overlap of said $\eta\%$ overlap block generator.

4. The system of claim 3 wherein said values depend on a defined center bin.

5. The system of claim 3 wherein said means for frequency shifting in the time domain is a complex multiplier which performs a frequency translation.

6. The system of claim 5 wherein values of said frequency translation are equivalent and opposite to the values of said circular rotation.

7. A method for enhancing phase continuity of blocks in a channelizer said method comprising the steps of:
   converting a received data stream with a $\eta\%$ overlap block generator to form blocks;
   performing a $N_{DFT}$-point Discrete Fourier Transform on said blocks to form bins;
   selecting a range of bins;
   multiplying the selected bins with frequency filter coefficients to form data points;
   frequency shifting said data points in a frequency domain;
   performing a $N_{IDFT}$-point Inverse Discrete Fourier Transform on said rotated data points;
   processing the data output from said Nidft-point Inverse Discrete Fourier Transform with a $\eta\%$ overlap block combiner to form a digital data stream; and
   frequency shifting said digital data stream output from the $\eta\%$ overlap block combiner in a time domain.

8. The method of claim 7 wherein the step of frequency shifting in the frequency domain is accomplished by circularly rotating said data points.

9. The method of claim 8 wherein values of said circular rotation depend on the percentage overlap of said $\eta\%$ overlap block generator.

10. The method of claim 9 wherein values of said circular rotation are dependent upon a defined center bin.

11. The method of claim 9 wherein the step of frequency translation in the time domain is accomplished by a complex multiplication.

12. The method of claim 11 wherein values of said complex multiplication are equivalent and opposite to the values of said circular rotation.

13. A system for enhancing a modified fast convolution algorithm applied to a de-channelizer, said system comprising:
    means for frequency shifting a data stream in a time domain;
    a $\eta\%$ overlap block generator for converting the frequency shifted data stream into blocks;
    means for performing a $N_{DFT}$-point Discrete Fourier Transform on said blocks to form bins;
    means for frequency shifting said bins in a frequency domain;
    a multiplier for multiplying said frequency shifted bins with frequency filter coefficients;
    means for performing a $N_{IDFT}$-point Inverse Discrete Fourier Transform on said multiplied bins and outputting a result; and
    a $\eta\%$ overlap block combiner for performing an overlap/save or overlap/add operation on said result.

14. The system of claim 13 wherein said means for frequency shifting in the frequency domain is a circular rotator which performs a circular rotation on said multiplied bins.

15. The system of claim 14 wherein values of said circular rotation are dependent on the percentage of overlap of the $\eta\%$ overlap block generator.

16. The system of claim 15 wherein said values depend on a defined center bin.

17. The system of claim 15 wherein the complex multiplier performs a frequency translation operation.

18. The system of claim 17 wherein values of said frequency translation are equivalent and opposite to the values of the circular rotation.

19. A method for enhancing a modified fast convolution algorithm applied to a de-channelizer, said method comprising the steps of:

frequency shifting a digital data stream in a time domain;

converting the frequency shifted data stream into blocks; and performing a $N_{DFT}$-point Discrete Fourier Transform on said blocks to form bins;

frequency shifting said bins in a frequency domain;

multiplying said frequency shifted bins with frequency filter coefficients;

performing a $N_{IDFT}$-point Inverse Discrete Fourier Transform on said multiplied bins and outputting a result; and performing an overlap/save or overlap/add operation on said result.

20. The method of claim 19 wherein said step of frequency shifting in the frequency domain is accomplished by circularly rotating said multiplied bins.

21. The method of claim 20 wherein values of said circular rotation are dependent on the percentage of overlap of the η% overlap block generator.

22. The method of claim 21 wherein said values depend on a defined center bin.

23. The method of claim 21 wherein the step of frequency translation in the time domain is accomplished by a frequency rotation operation.

24. The method of claim 23 wherein values of said frequency translation are equivalent and opposite to the values of the circular rotation.

* * * * *